(12) United States Patent
Bhoria et al.

(10) Patent No.: US 9,244,837 B2
(45) Date of Patent: Jan. 26, 2016

(54) ZERO CYCLE CLOCK INVALIDATE OPERATION

(71) Applicant: Texas Instruments Incorporated, Dallas, TX (US)

(72) Inventors: Naveen Bhoria, Plano, TX (US); Raguram Damodaran, Plano, TX (US); Abhijeet Ashok Chachad, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 469 days.

(21) Appl. No.: 13/649,269

(22) Filed: Oct. 11, 2012

(65) Prior Publication Data

US 2014/0108737 A1   Apr. 17, 2014

(51) Int. Cl.
*G06F 12/00* (2006.01)
*G06F 12/08* (2006.01)
*G06F 12/12* (2006.01)
*G06F 13/28* (2006.01)

(52) U.S. Cl.
CPC ............ *G06F 12/08* (2013.01); *G06F 12/0891* (2013.01); *G06F 12/122* (2013.01); *G06F 13/28* (2013.01)

(58) Field of Classification Search
CPC ... G06F 12/0891; G06F 12/12; G06F 12/121; G06F 12/122
USPC .................................................. 711/136, 144
See application file for complete search history.

(56) References Cited

U.S. PATENT DOCUMENTS

| | | | |
|---|---|---|---|
| 2002/0069330 A1* | 6/2002 | Chauvel et al. | 711/141 |
| 2004/0148464 A1* | 7/2004 | Jang | 711/120 |
| 2009/0063771 A1* | 3/2009 | Toussi | 711/118 |
| 2009/0063782 A1* | 3/2009 | Toussi | 711/144 |
| 2010/0146335 A1* | 6/2010 | Moyer et al. | 714/25 |

* cited by examiner

*Primary Examiner* — Prasith Thammavong
(74) *Attorney, Agent, or Firm* — Robert D. Marshall, Jr.; Frank D. Cimino

(57) ABSTRACT

A method to eliminate the delay of a block invalidate operation in a multi CPU environment by overlapping the block invalidate operation with normal CPU accesses, thus making the delay transparent. A range check is performed on each CPU access while a block invalidate operation is in progress, and an access that maps to within the address range of the block invalidate operation is treated as a cache miss to ensure that the requesting CPU will receive valid data.

5 Claims, 4 Drawing Sheets (1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

US 9,244,837 B2

ZERO CYCLE CLOCK INVALIDATE OPERATION

TECHNICAL FIELD OF THE INVENTION

The technical field of this invention is Cache memories for digital data processors.

BACKGROUND OF THE INVENTION

In a hierarchical cache system a block invalidate operation may be needed to invalidate a block of lines cached in the memory system. In the block coherence operation the user programs the base address and the number of words that need to be removed from the cache. The cache controller then iterates through the entire cache memory, and if it finds an address that is within the intended address range the controller will mark that particular set and way invalid. Block invalidate operations are typically required to keep data coherent within a multi processor system.

An example is illustrated in FIG. 6. In a multi core environment CPU1 601 is updating data within address range A. After CPU1 is done, an other CPU may start a process 603 and update data within the same address range. If during this time CPU1 needs to access data within this address range, it will need to get an updated copy of the data from the other CPU, however some of the required data still may be cached in CPU1—hence CPU1 will get old data unless a block invalidate 602 operation will be performed on CPU1's cache within the same address range A. This will then ensure that CPU1 request will result in a cache miss, and the correct data will be supplied from main memory.

SUMMARY OF THE INVENTION

The method described in this invention eliminates the delay inherent in the block invalidate operation shown in FIG. 6 by doing a range check on each attempted CPU access while a block invalidate operation is in progress. If a CPU access results in a cache hit but the cache address falls within the block invalidate operation range the access will be treated as a cache miss, ensuring that correct data will be accessed from main memory without the need to wait until the block invalidate operation is completed.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
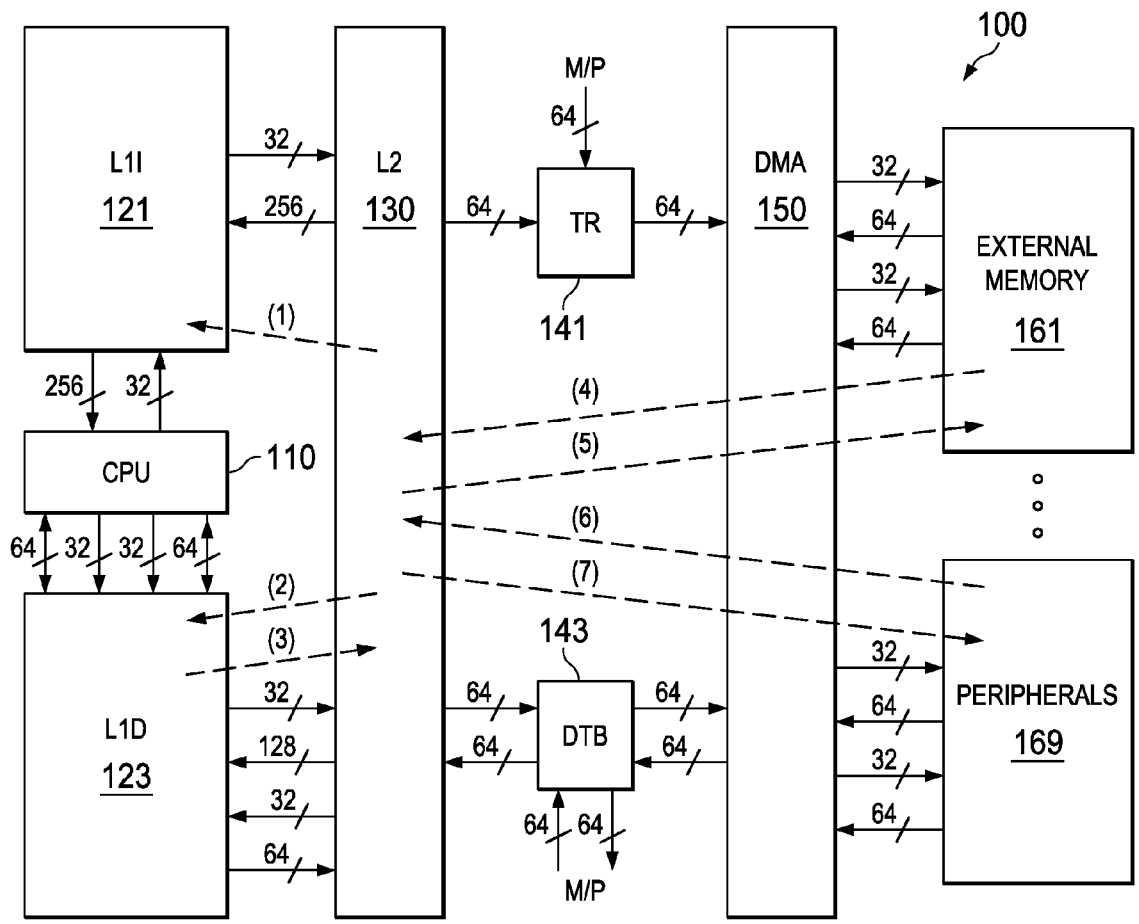
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

FIG. 1 illustrates several data/instruction movements within the digital signal processor system 100. These include: (1) instructions move from L2 cache 130 to L1I cache 121 to fill in response to a L1I cache miss; (2) data moves from L2 cache 130 to L1D cache 123 to fill in response to a L1D cache miss; (3) data moves from L1D cache 123 to L2 cache 130 in response to a write miss in L1D cache 123, in response to a L1D cache 123 victim eviction and in response to a snoop from L2 cache 130; (4) data moves from external memory 161 to L2 cache 130 to fill in response to L2 cache miss or a direct memory access (DMA) data transfer into L2 cache 130; (5) data moves from L2 cache 130 to external memory 161 in response to a L2 cache victim eviction or writeback and in response to a DMA transfer out of L2 cache 130; (6) data moves from peripherals 169 to L2 cache 130 in response to a DMA transfer into L2 cache 130; and (7) data moves from L2 cache 130 to peripherals 169 is response to a DMA transfer out of L2 cache 130.

Figure 2:
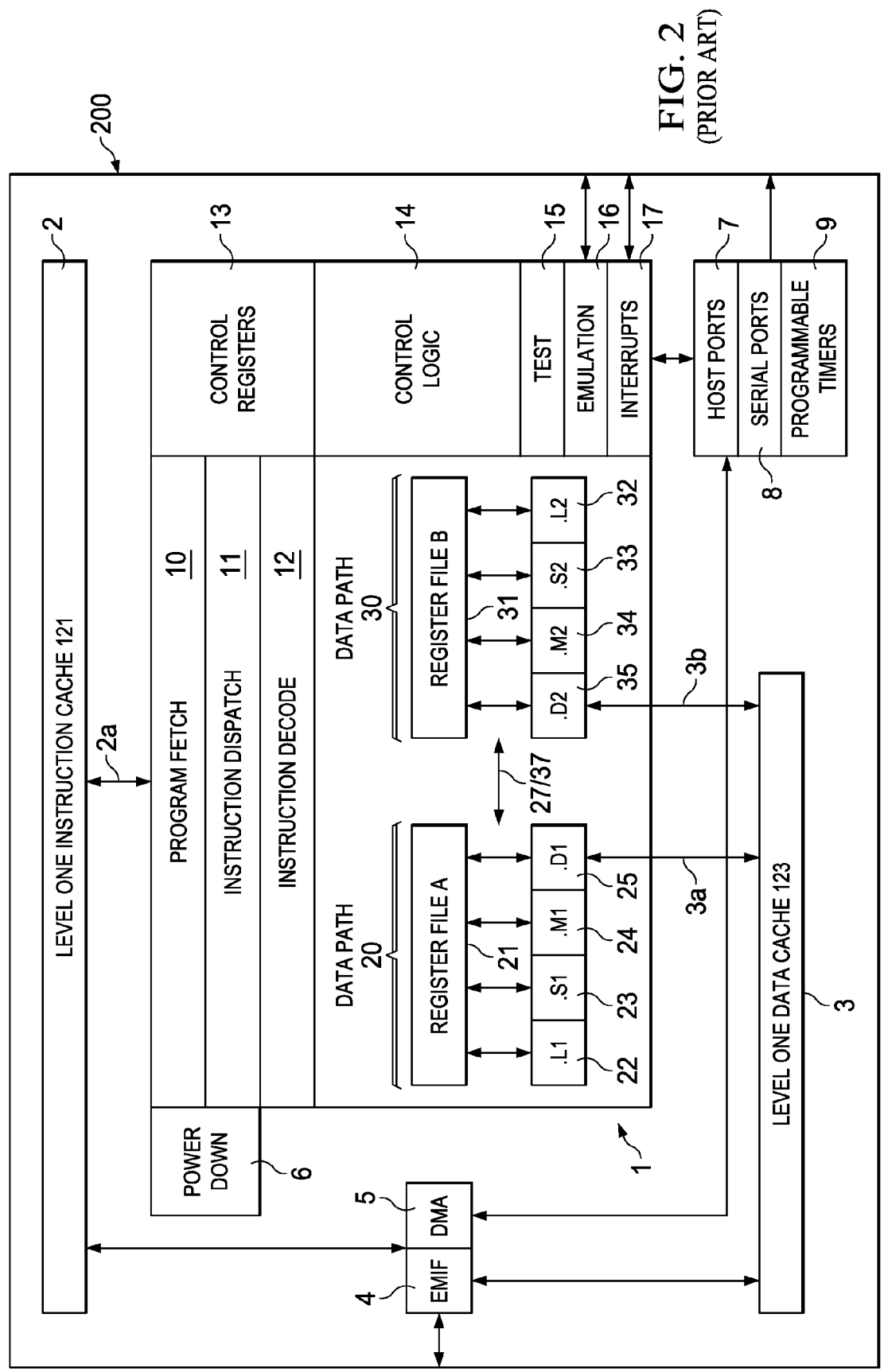
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor.

Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
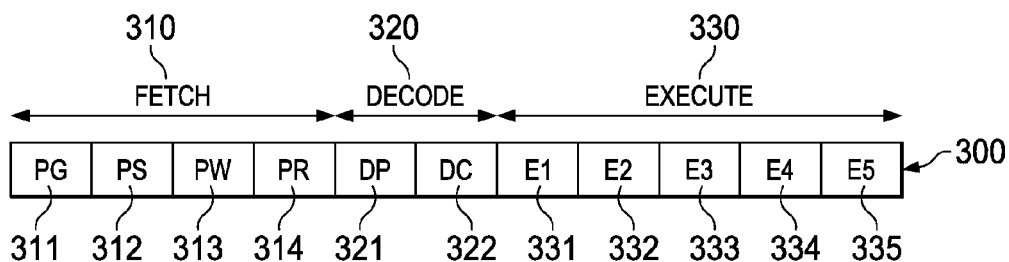
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
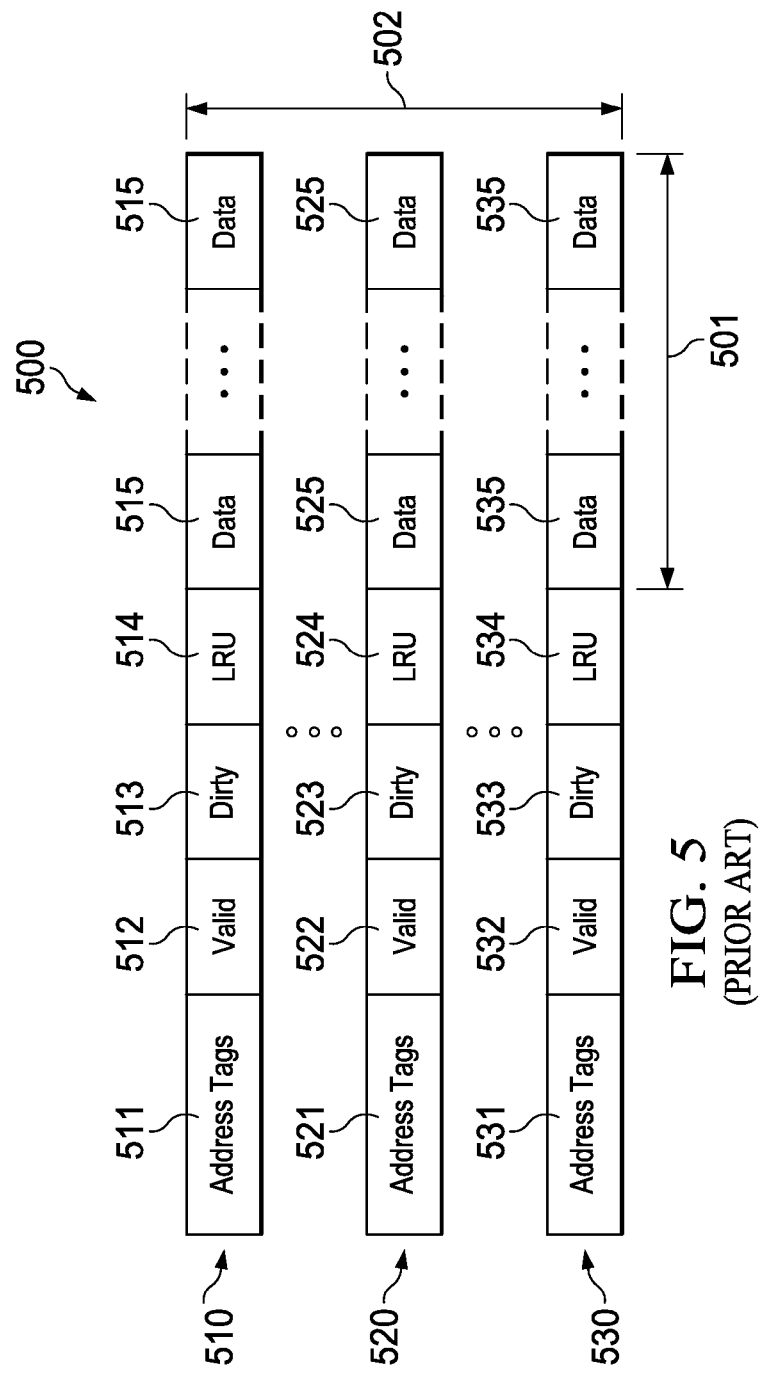
FIG. 4 illustrates the instruction syntax of the very long instruction word digital signal processor core illustrated in FIG. 2 (prior art)
FIG. 5 illustrates the details of a set of typical prior art cache lines (prior art)
Figure 6:
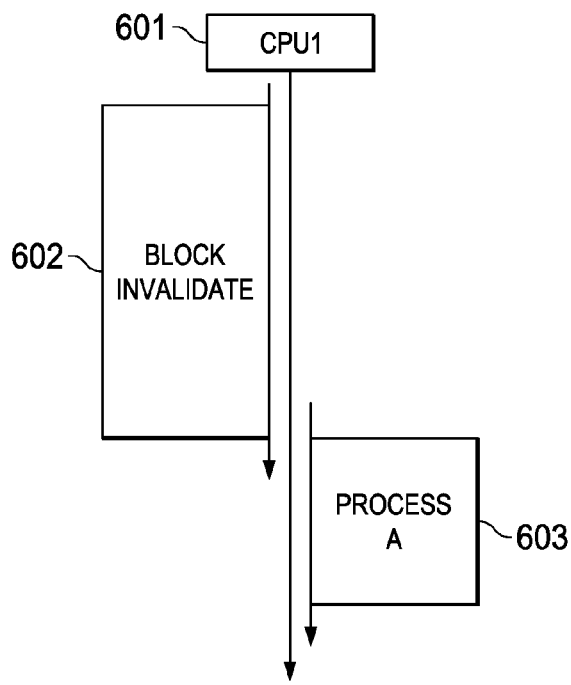
FIG. 6 illustrates block coherence operation done in a serial manner.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional   | creg |    |    | z |
|---------------|------|----|----|---|
| Register      | 31   | 30 | 29 | 28|
| Unconditional | 0    | 0  | 0  | 0 |
| Reserved      | 0    | 0  | 0  | 1 |
| B0            | 0    | 0  | 1  | z |
| B1            | 0    | 1  | 0  | z |
| B2            | 0    | 1  | 1  | z |
| A1            | 1    | 0  | 0  | z |
| A2            | 1    | 0  | 1  | z |
| A0            | 1    | 1  | 0  | z |
| Reserved      | 1    | 1  | 1  | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the details of plural cache lines such as used in L1I cache 121, L1D cache 123 and L2 cache 131 illustrated in FIG. 1. Cache 500 illustrated in FIG. 5 includes cache lines 510, 520 and 530 that are representative of the internal structure of cache 500. Each of cache lines 510, 520 and 530 includes: respective address tags 511, 521 and 522 531; respective valid bits 512, 522 and 532; respective dirty bits 513, 523 and 533; respective least recently used (LRU) indicators 514, 524 and 534; and respective data words 515, 525 and 535. Each cache line 510, 520 and 530 includes plural respective data words 515, 525 and 535. The bit length of data words 515, 525 and 535 is set by the minimal addressable data amount of CPU 110. This is typically 8 bits/1 byte.

Cache 500 stores data from more distant memories such as external memory 131 which are accessed by a multi-bit address. Cache 500 is organized to facilitate this storage and to facilitate finding such data in the cache. Each cache line 510, 520 and 530 typically stores $2^N$ respective data words 515, 525 and 535, where N is an integer. The position of data words 515, 525 and 535 within the corresponding cache line 510, 520 and 530 along the dimension 501 serves as a proxy for the least significant bits of the address.

The position of cached data within lines along dimension 502 serves as a proxy for the next most significant bits of the address. The corresponding address tags 511, 521 and 531 form the remainder of the data word address. To determine if a memory access is to data cached within cache 500 (a cache hit), cache 500 compares the address tags for all cache lines to the most significant bits of the memory location accessed. Upon a detecting a match, the position within the cache line along dimension 501 corresponds to the least significant bits of the address permitting identification of the data word accessed.

Each data word 510, 520 and 530 includes a corresponding valid bit 512, 522 and 532. A first state of this valid bit indicates the corresponding data words 515, 525 or 535 are valid. An opposite state of this valid bit indicates the corresponding data words 515, 525 or 535 are not valid. There are several instances where data stored within cache 500 would not be valid. Upon initial activation of digital signal processor system 100 the L1I cache 121, L1D 123 cache and L2 cache 131 would not be loaded. Thus they would not store valid data. Accordingly, all cache lines are initially marked invalid. During a cache access a match of a requested address with address tags 511, 521 or 531 does not detect a match unless the corresponding valid bit 512, 522 or 532 indicated the data was valid.

Each data word 510, 520 and 530 includes a corresponding dirty bit 513, 523 and 533. A first state of this valid bit indicates the corresponding data words 515, 525 or 535 are dirty. An opposite state of this valid bit indicates the corresponding data words 515, 525 or 535 are not dirty (clean). Cache memory is generally used for both read accessed and write accesses. Upon a cache hit for a write access, the write data is written into the corresponding location within cache 500. According to the preferred writeback technique, this write data is not immediately forwarded to external memory 131. Instead the respective dirty bit 513, 523 or 533 is set to indicate dirty. A dirty indication means that there has been a write to the cached data not currently reflected in the base memory. According to the writeback technique this data is written to the base memory with the expectation that this writeback can accumulate plural writes to the memory location and nearby memory locations within the same cache line to reduce traffic on the bus to external memory 131.

The least recently used (LRU) bits 514, 524 and 534 are used when a cache line is replaced. Because the cache cannot hold all the data stored in the large, slow memory, the data within the cache must be replaced with new data regularly. Using a data words location within dimensions 501 and 502 as proxy for the least significant bits introduces a problem in locating data within cache 500. If there is only a single cache line having the same location on dimensions 501 and 502, then plural data from the large, slow memory will alias to the same cache line in cache 500. This is data having the same least significant address bits corresponding to dimensions 501 and 502 but differing most significant address bits. An access to such aliased data would require the previous data at that cache line to be replaced. This is considered disadvantageous. A typical prior art cache is set associative. Thus a set of cache lines have the same location on dimensions 501 and 502. Typical sets include two members (two-way set associative) or four members (four-way set associative). Each cache line of such a set is called a way. A cache miss to an address that aliases to one of these sets needs only to evict one of these ways. Determination of which way to evict is typically made based on prior usage of these ways. According to both the temporal and spatial locality principles more recently used cache ways are more likely to be reused than less recently used cache ways. LRU bits 514, 524 and 534 track accesses to cache ways within the set. When data is to be replaced, the LRU bits indicate the least recently used way for replacement. Maintaining cache coherence requires writeback of a dirty way upon such replacement.

Figure 7:
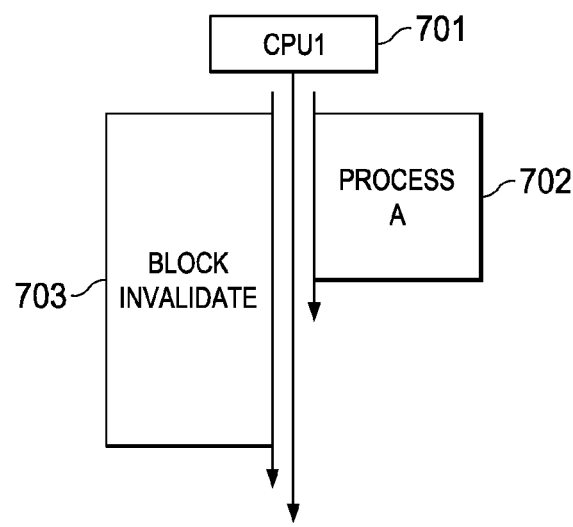
FIG. 7 illustrates block coherence operation done in a parallel manner.

FIG. 7 illustrates a block invalidate operation required to ensure cache coherence according this invention. In a multi core environment, CPU1 701 is updating data within its address range A. After CPU1 is done, another CPU may start a process 702 and update data within the same address range. If during this time CPU1 needs to address data within the same address range, it will need to get an updated copy of the data, however some of the data still may be cached in CPU1, therefore CPU1 may get old data unless a block invalidate operation 703 is performed on CPU1's cache within the same address range. In order to eliminate the requirement for CPU1 to wait until the block invalidate operation is completed, a range check will be performed on each CPU address while the block invalidate operation is in progress. If a CPU access request results in a cache hit but the address is within the block invalidate operation's range, the access request will be treated as a cache miss, the cache controller will mark the line as invalid, and issue a read miss request. This will ensure that even though CPU1 did not wait for the block invalidate operation to complete, it will still get updated data from the main memory.

Figure 8:
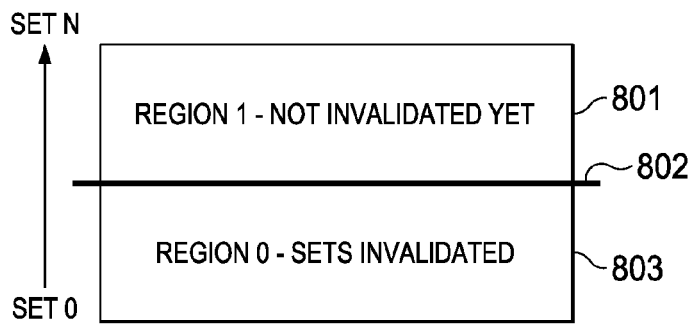
FIG. 8 illustrates the cache invalidate operation in progress.

FIG. 8 further illustrates a block invalidate operation in progress according to this invention. If a CPU accesses region 0 803, it will be treated as a normal access as invalidation operation 802 has been completed on this part of the address range. If a CPU access maps to region 1 801, the access will be treated as a cache miss as this region may have invalid data, and the line will be marked as invalid. In order to prevent the line being invalidated a second time when the block invalidate operation progresses to this line, a valid/invalid bit is added to the LRU. This bit is set when a CPU access is to region 1 801 within the address range of the block invalidate operation, signifying that the line has already been invalidated.

What is claimed is:

1. A method of cache block invalidation comprising the steps of:
   receiving a cache block invalidation command indicating a range of addresses to be invalidated;
   iterating said cache block invalidation command over address tags of all cache entries of a cache including
      comparing an address tag of each cache entry to said range of addresses to be invalidated, and
      if said address tag is within said range of addresses to be invalidated, setting a valid bit for data corresponding to said address tag to indicate an invalid state; and
   upon receipt of a cache access during said step of iterating
      comparing an address accessed by said cache access to said range of addresses to be invalidated, and
      if said address accessed by said cache access is within said range of addresses to be invalidated, generating a cache miss in response to said cache access.

2. The method of claim 1, wherein:
   said step of indicating a range of addresses to be invalidated includes indicating a base address and a number of words to be invalidated.

3. A method of cache block invalidation comprising the steps of:
   receiving a cache block invalidation command indicating a range of addresses to be invalidated;
   iterating said cache block invalidation command over address tags of all cache entries of a cache including
      comparing an address tag of each cache entry to said range of addresses to be invalidated, and
      if said address tag is within said range of addresses to be invalidated, setting an invalid bit for data corresponding to said address tag to indicate an invalid state; and
   upon receipt of a cache access during said step of iterating
   iterating said cache access over address tags of all cache entries of said cache including
      for cache entries not yet iterated over by said cache block invalidation command comparing an address accessed by said cache access to said range of addresses to be invalidated
         if said address accessed by said cache access is within said range of addresses to be invalidated, generating a cache miss in response to said cache access,
         if said address accessed by said cache access is not within said range of addresses to be invalidated, handling said cache access normally, and
      for cache entries already iterated over by said cache block invalidation command, handling said cache access normally.

4. The method of claim 3, wherein:
   said step of generating a cache miss for cache entries not yet iterated over by said cache block invalidation command further includes setting a valid bit within a least recently used indicator for data corresponding to said address tag to indicate an invalid state; and
   said step of iterating said cache block invalidation command over address tags of all cache entries of a cache further includes
      determining whether said valid bit within said least recently used indicator for data corresponding to said address tag to indicates an invalid state, and
      if said valid bit within said least recently used indicator for data corresponding to said address tag to indicates an invalid state, skipping said step of comparing each address tag to said range of addresses to be invalidated, and always setting said invalid bit for data corresponding to said address tag to indicate said invalid state.

5. The method of claim 3, wherein:
   said step of indicating a range of addresses to be invalidated includes indicating a base address and a number of words to be invalidated.

* * * * *